United States Patent [19]
Guan et al.

[11] Patent Number: 6,071,980
[45] Date of Patent: Jun. 6, 2000

[54] ATOM TRANSFER RADICAL POLYMERIZATION

[75] Inventors: Zhibin Guan, Hockessin; Bruce Edmund Smart, Wilmington, both of Del.

[73] Assignee: E. I. du Pont de Nemours and Company, Wilmington, Del.

[21] Appl. No.: 09/135,778

[22] Filed: Aug. 18, 1998

Related U.S. Application Data

[60] Provisional application No. 60/057,678, Aug. 27, 1997.
[51] Int. Cl.[7] ...................................................... C08F 2/46
[52] U.S. Cl. ................................. 522/66; 522/27; 522/29; 522/59
[58] Field of Search .................................. 522/27, 29, 59, 522/66

[56] References Cited

U.S. PATENT DOCUMENTS 5,763,548  6/1998  Matyjazewski et al. ................ 526/135

FOREIGN PATENT DOCUMENTS

WO 96/30421  10/1996  WIPO ........................... C08F 297/00

OTHER PUBLICATIONS

J–S. Wang et al., *J. Am. Chem. Soc.,* 117, 5614–5615, 1995.
J–S. Wang, *Macromolecules,* 28, 7572–7573, 1995.
M. Kato et al., *Macromolecules,* 28, 1721–1723, 1995.
T. Patten et al., *Science,* 272, 866–868, 1996.
C. Granel et al., *Macromolecules,* 29, 8576–8582, 1996.
J–S. Wang et al., *Macromolecules,* 28, 7901–7910, 1995.
V. Percec et al., *Macromolecules,* 29, 3665–3668, 1996.
V. Percec et al., *Macromolecules,* 28, 7970–7972, 1995.

*Primary Examiner*—David W. Wu
*Assistant Examiner*—Caixia Lu-Rutt

[57] ABSTRACT

Exposing to visible light atom transfer radical polymerizations of vinyl monomers that use transition metal compounds often results in faster polymerizations and/or the need for less transition metal compound. Disclosed is a process for the polymerization of vinyl monomers by atom transfer radical polymerization using a first compound containing a transition metal and a second compound capable of radically transferring an atom or group to said first compound, wherein the improvement comprises, irradiating with visible light with an intensity of at least about 5 mW/cm$^2$ a liquid in which said polymerization is taking place. The polymers made are useful for molding resins and coatings.

10 Claims, No Drawings

ATOM TRANSFER RADICAL POLYMERIZATION

This application claims the priority benefit of U.S. Provisional Application Ser. No. 60/057,678, filed Aug. 27, 1997.

FIELD OF THE INVENTION

Disclosed is an improved atom transfer polymerization process which includes exposing an atom transfer radical polymerization process to visible light thereby increasing the polymerization rate and conversion of monomers, while significantly reducing the amount of transition metal compound catalyst needed.

TECHNICAL BACKGROUND

Radical polymerization is an important commercial process for making a variety of polymers of vinyl monomers, such as acrylics and styrenics. While large amounts of polymers are made by this type of process, it does have some disadvantages, such as relatively poor control of polymer architecture. For instance, while molecular weight and/or molecular weight distribution may be controlled to some extent, close control of one or both of these parameters is usually difficult or impossible.

These parameters can be more closely controlled in so-called living-type polymerizations, but such polymerizations are unusual using radical polymerization methods. One such radical polymerization method is "atom transfer radical polymerization" (ATRP). In this process a transition metal (compound), usually in a lower valent state, is contacted with a compound which is capable of transferring an atom (radical) to the metal complex, thereby oxidizing the metal to a higher valent state and forming a radical which can initiate polymerization. However, at any time the atom that was transferred to the metal complex may be reversibly transferred back to the growing polymer chain, thereby forming a living polymerization system in which the molecular weight may be closely controlled and oftentimes the molecular weight distribution is narrow.

Such ATRPs are described in J -S. Wang, et al., J. Am. Chem. Soc., vol. 117, p. 5614–5615 (1995); J -S. Wang, Macromolecules, vol. 28, p. 7572–7573 (1995); M. Kato, et al., Macromolecules, vol. 28, p. 1721–1723 (1995); T. Patten, et al., Science, vol. 272, p. 866–868 (1996); C. Granel, et al., Macromolecules, vol. 29, p. 8576–8582 (1996); J -S. Wang, et al., Macromolecules, vol. 28, p. 7901–7910 (1995); V. Percec, et al., Macromolecules, vol. 29, p. 3665–3668 (1996); V. Percec, et al., vol. 28, p. 7970–7972 (1995); and World Patent Application WO 96/30421 which are all hereby included by reference. None of these references mention exposure of ATRPs to visible light.

SUMMARY OF THE INVENTION

This invention concerns a process for the polymerization of vinyl monomers by atom transfer radical polymerization using a first compound containing a transition metal and a second compound capable of radically transferring an atom or group to said first compound, wherein the improvement comprises, irradiating with visible light with an intensity of at least about 5 mW/cm$^2$ a liquid in which said polymerization is taking place.

This invention also concerns a process for the polymerization of vinyl monomers, comprising, contacting in a liquid medium a first compound containing a transition metal, a second compound capable of radically transferring an atom or group to said first compound, and one or more of said vinyl monomers to cause said polymerization, provided that while said polymerization is occurring said liquid medium is irradiated with visible light with an intensity of at least about 5 mW/cm$^2$.

DETAILS OF THE INVENTION

For a discussion of free radically polymerizable vinyl monomers see for instance H. Mark, et al., Ed., Encyclopedia of Polymer Science and Engineering, 2$^{nd}$ Ed., Vol. 13, John Wiley & Sons, New York, 1988, p. 708–713, which is hereby included by reference. Suitable vinyl monomers include various vinyl halides such as vinyl chloride, vinyl fluoride and vinylidene fluoride, vinyl ethers such as methyl vinyl ether and perfluoro(methyl vinyl ether), chloroprene, isoprene, vinyl esters such as vinyl acetate, and styrenic and acrylic monomers which are preferred.

By an acrylic monomer is meant acrylonitrile or a compound of the formula

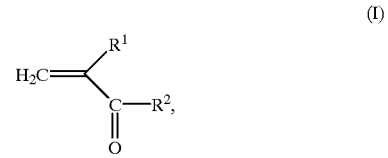

wherein $R^1$ is hydrogen or methyl, $R^2$ is halogen, —OH, —OR$^3$, or —NR$^4$R$^5$, $R^3$ is hydrocarbyl or substituted hydrocarbyl, and $R^4$ and $R^5$ are each independently hydrogen, hydrocarbyl or substituted hydrocarbyl. In preferred acrylics, $R^2$ is —OH, or $R^2$ is —OR$^3$ wherein $R^3$ is alkyl containing 1 to 10 carbon atoms, more preferably methyl or ethyl, or substituted alkyl, especially 2-hydroxymethyl or glycidyl. In another (I) $R^3$ is alkyl substituted with one or more ester or amide groups of acrylic or methacrylic acid, thereby forming a di- or higher functional acrylate or methacrylate.

By a styrenic monomer is meant a compound of the formula

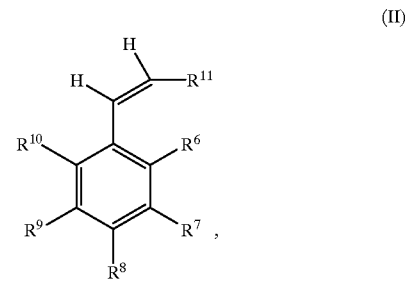

wherein each of $R^6$, $R^7$, $R^8$, $R^9$ and $R^{10}$ are each independently hydrogen hydrocarbyl, substituted hydrocarbyl or a functional group, preferably all hydrogen, and $R^{11}$ is hydrogen or methyl, preferably hydrogen.

By hydrocarbyl is meant a univalent radical containing only carbon and hydrogen. By substituted hydrocarbyl, substituted alkyl, and the like is meant a group which contains one or more (types of) substitutents that does not interfere with the operation of the polymerization catalyst system. Suitable substituents include halo, ester, keto (oxo), amino, imino, carboxyl, hydroxy, amide, nitrile, and ether.

Preferred substituents are halo, ester, amino, carboxyl, and amide. If not otherwise stated, hydrocarbyl, alkyl and all other similar groups containing carbon atoms preferably contain 1 to 20 carbon atoms. By a functional group herein is meant an inert functional group that does not interfere with the polymerization process described herein. Examples of such groups include alkoxy, aryloxy, ester, amido and halo.

Another component of the polymerization process system is a compound containing a transition metal atom, preferably in a lower valent state. By this is meant a compound containing at least one transition metal atom that is capable of existing in a (being oxidized to) higher valent state. Included within the definition of a compound containing a transition metal atom in a lower valent state is a compound or combination of compounds that under the polymerization process conditions can form in situ the desired compound containing a transition metal atom in a lower valent state. In some cases this can include metal itself (or an alloy thereof) which can dissolve in the process medium. In another instance, $CuCl_2$ is reported to form CuCl in the presence of styrene [M. Asscher, et al., J. Chem. Soc., (1963), p. 1887], so addition of $CuCl_2$ to a polymerization in which styrene was present would fulfill the requirement for the presence of a lower valent metal.

Suitable lower valent metals include Cu[I], Ru[II], Ni[II], Fe[II], Pd[II] and Rh[II], and Cu[I], Ru[II], Ni[II] and Rh(II) are preferred, and Cu[I] is especially preferred. The transition metal compound should preferably be at least slightly soluble in the polymerization medium. Optionally the transition metal compound which is added may be solublized by the addition of certain complexing agents. For example, CuCl may be solublized by the addition of a 2,2'-bipyridine or 4,4'-dinonyl-2,2'-bipyridine to the process medium, or may be added directly as a 2,2'-bipyridine-type complex. Other useful transition metal compounds are $RhCl[P(C_6H_5)_3]_3$ and $RuCl_2[P(C_6H_5)_3]_3$.

The polymerization is carried out in a liquid medium, for instance a solvent (for some or all of the starting materials and optionally the polymer) may be added, or the polymerization may be carried out in neat liquid monomer(s) (in bulk). In these bulk polymerizations, conversion to polymer may be limited by increasing viscosity or by formation of "solid" polymer. Useful liquids include aromatic hydrocarbons such as a xylene, and ethers such as 1,4-dioxane and anisole.

It is preferred to carry out the polymerization at a temperature of about 0° C. to about 200° C., preferably about 50° C. to about 175° C. and more preferably about 75° C. to about 150° C. The upper temperature should not be above the temperature at which significant thermal decomposition of the polymer occurs. Such temperatures are well known for many free radically polymerizable monomers, and are otherwise readily determined.

Another part of the polymerization system is a compound capable of transferring an atom to the transition metal compound. For instance, this may be an arylsulfonyl halide of the formula $Ar^1SO_2X$ wherein $Ar^1$ is an aryl or substituted aryl group, and X is chlorine or bromine. It is preferred that X is chlorine, and/or that $Ar^1$ is phenyl or substituted phenyl. Suitable substituents include one or more of nitro, fluoro, chloro, alkyl, and alkoxy. It is more preferred that $Ar^1$ is phenyl or p-methoxyphenyl. This compound may also be an organic halide (in which at least one halogen atom is bound to carbon) such as carbon tetrachloride, 1-phenethyl chloride, 1-phenethyl bromide, ethyl 2-chloropropionate, α,α'-dibromoxylene, and 2-bromoisobutyrophenone.

In the process described herein the liquid medium (and hence the process ingredients) are exposed to visible light during at least half of the conversion of the monomer(s), and preferably essentially all of the polymerization is taking lace. By visible light is meant electromagnetic radiation with a wavelength of about 400 nm to about 700 nm. The visible light should have an intensity of about 5 $mW/cm^2$ or more, preferably about 10 $mW/cm^2$ or more, and more preferably about 20 $mW/cm^2$ or more. Of course if the light source is outside of the vessel in which the polymerization is being done, the vessel should be essentially transparent to at least part of the visible light. It is preferred that during the polymerization the liquid medium be agitated.

The polymerization process described herein may be carried out using methods known to the artisan, see for instance H. Mark, et al., Ed., Encyclopedia of Polymer Science and Engineering, $2^{nd}$ Ed., Vol. 12, John Wiley & Sons, New York, 1988, p. 504–555. For instance, these polymerizations may be carried out in a batch, semi-batch or continuous manner.

Sometimes the free radical polymerization described herein may possess characteristics of so-called "living" or "controlled" polymerization processes. Such processes can lead to polymers with narrow molecular weight distributions (Mw/Mn<2), and may permit formation of block copolymers by sequential addition of polymerizable monomers. For these types of polymerizations, Cu[I], Rh[II], Ni[II], and Ru[II] are preferred transition metals and Cu[I] is especially preferred, and preferred monomers are styrenics and acrylics. For a discussion of "living" polymerizations see H. Mark, et al., Ed., Encyclopedia of Polymer Science and Engineering, Vol. 8, John Wiley & Sons, New York, 1968, p. 303–325, and H. Mark et. al., Ed., Encyclopedia of Polymer Science and Engineering, $2^{nd}$ Ed., Supplement Volume, John Wiley & Sons, New York, 1989, p. 429–437, both of which are hereby included by reference.

The polymers made by the process disclosed herein are useful as molding resins and for coatings.

In the Examples and Comparative Examples, the following abbreviations are used:

bipy—2,2-bipyridine

GPC—gel permeation chromatography

MMA—methyl methacrylate

Mn—number average molecular weight

Mw—weight average molecular weight

PDI—Mw/Mn

PMMA—poly(methyl methacrylate)

THF—tetrahydrofuran

For all examples which were irradiated by visible light, the light source was a 275 W sunlamp manufactured by GTE Sylvania, Inc. The lamp was held about 15 cm away from the surface of the Schlenk flask. The measured intensity of visible light about 15 cm from the surface of the lamp was 135 $mW/cm^2$. In all of the examples stirring was accomplished by a magnetic stirrer.

All of the polymerizations were run in Schlenk flasks which were loaded with the process solution in a dry box. The flasks were then removed from the dry box and irradiated with visible light while stirring.

COMPARATIVE EXAMPLE A

MMA was passed through basic a alumina column to remove inhibitor, and degassed by 3 freeze-thaw cycles. Five mg of CuCl and 24 mg of 2,2'-bipyridyl were put into 5 mL of degassed toluene. Five mL of purified MMA and 66

μL of 2,2'-dichloroacetophenone were added to the above catalyst solution. The solution was mixed well and sealed under nitrogen, then immersed in an oil bath set at 80° C. Polymerization proceeded at 80° C. with stirring in dark for 16 h. (Ambient light in this room had an intensity of about 1 mW/cm$^2$, but during virtually all of this time the polymerization was shielded from this light.) After stopping the polymerization, the solution was diluted with more toluene and then the polymer was precipitated into methanol. Polymer solid was collected by filtration, washed with methanol, and dried under vacuum, and 1.92 g polymer was obtained (41% conversion of MMA). GPC (THF, PMMA standard): Mn 4830; Mw/Mn 1.42.

EXAMPLE 1

MMA was passed through a basic alumina column to remove inhibitor, then degassed by 3 freeze-thaw cycles. Five mg of CuCl and 24 mg of 2,2'-bipyridyl were put into 5 mL of degassed toluene. Five mL of purified MMA and 66 μL of 2,2'-dichloroacetophenone were added to the above catalyst solution. The solution was mixed well and sealed under nitrogen, then immersed in an oil bath set at 80° C. Polymerization proceeded at 80° C. with stirring and under the irradiation of a 275 watts sunlamp for 16 h. After stopping the polymerization, the solution was diluted with more toluene and then the polymer was precipitated into methanol. Polymer solid was collected by filtration, washed with methanol, and dried under vacuum, and 4.75 g polymer was obtained (100% conversion of MMA). GPC (THF, PMMA standard): Mn 10500; Mw/Mn 1.25.

EXAMPLE 2

Two mg of CuCl and 10 mg of 2,2'-bipyridyl were put into 10.0 mL of degassed toluene. Ten mL of purified MMA and 132 μL of 2,2'-dichloroacetophenone were added to the above catalyst solution. The solution was mixed well and sealed under nitrogen, then immersed in an oil bath set at 80° C. Polymerization proceeded at 80° C. with stirring and under the irradiation of a 275 watt sunlamp for 16 h. After stopping the polymerization, the solution was diluted with more toluene and then the polymer was precipitated into methanol. Polymer solid was collected by filtration, washed with methanol, and dried under vacuum, and 7.01 g polymer was obtained (75% conversion of MMA). GPC (THF, PMMA standard): Mn 12300; Mw/Mn 1.33.

COMPARATIVE EXAMPLE B

MMA was passed through a basic alumina column to remove inhibitor, then degassed by 3 freeze-thaw cycles. Five mg of CuCl and 32 mg of 5,6-dimethyl-1,10-phenanthroline were put into 10.0 mL of degassed toluene. Five mL of purified MMA and 66 μL of 2,2'-dichloroacetophenone were added to the above catalyst solution. The solution was mixed well and sealed under nitrogen, then immersed in an oil bath set at 80° C. Polymerization proceeded at 80° C. with stirring in dark for 16 h. After stopping the polymerization, the solution was diluted with more toluene and then polymer was precipitated into methanol. Polymer solid was collected by filtration, washed with methanol, and dried under vacuum and 1.09 g polymer was obtained (23% conversion of MMA). GPC (THF, PMMA standard): Mn 12700; Mw/Mn 1.42.

EXAMPLE 3

MMA was passed through a basic alumina column to remove inhibitor, then degassed by 3 freeze-thaw cycles. Five mg of CuCl and 32 mg of 5,6-dimethyl-1,10-phenanthroline were put into 10.0 mL of degassed toluene. Five mL of purified MMA and 66 μL of 2,2'-dichloroacetophenone were added to the above catalyst solution. The solution was mixed well and sealed under nitrogen, then immersed in an oil bath set at 80° C. Polymerization proceeded at 80° C. with stirring and under the irradiation of a 275 watt sunlamp for 16 h. After stopping the polymerization, the solution was diluted with more toluene and then the polymer was precipitated into methanol. Polymer solid was collected by filtration, washed with methanol, and dried under vacuum, and 3.43 g polymer was obtained (73% conversion of MMA). GPC (THF, PMMA standard): Mn 7540; Mw/Mn 1.25.

EXAMPLES 4 AND 5 AND COMPARATIVE EXAMPLES C–E

All of these Examples and Comparative Examples were done in a manner similar to that of Example 1, except the ingredients and ingredient amounts used were different. For all of these polymerization in which an atom donor (RCl) was used, it was 1,1-dichloroacetophenone. Comparative Example C was carried out in the dark.

TABLE 1

| Ex. | MMA (mL) | RCl (mL) | CuCl (mg) | bipy (mg) | g polymer (%) | Mn (Mw/Mn) |
|---|---|---|---|---|---|---|
| C | 5 | 66 | 5.0 | 24 | 1.95 (41%) | 4830 (1.42) |
| 4 | 5 | 66 | 5.0 | 24 | 4.75 (100%) | 10500 (1.25) |
| D | 10 | 0 | 0 | 0 | 1.81 (19%) | 592000 (2.25) |
| E | 10 | 132 | 0 | 0 | 8.17 (87%) | 35800 (2.52) |
| 5 | 10 | 132 | 2.0 | 10 | 7.01 (75%) | 12300 (1.33) |

EXAMPLE 6

Two polymerizations were run in an identical manner except one was allowed to run in the dark, and the other was irradiated as described above with the 275 W sunlamp.

Two polymerization reactions were prepared. For each, MMA was passed through a basic alumina column to remove inhibitor, then degassed by 3 freeze-thaw cycles. Fifteen mg of CuCl and 70.5 mg of 2,2'-dipyridyl were added to of degassed toluene, and then 15.0 mL of the degassed MMA and 198 mg of 2,2'-dichloroacetophenone were added to the toluene solution. The solution was well mixed in the Schlenk flask and sealed under nitrogen, then immersed in an 80° C. oil bath. One reaction proceeded in the dark, while the other was irridiated with sunlamp.

At the times designated in Table 2, about 3 mL of each polymerization were withdrawn, and dissolved in CDCl$_3$ for measurement of conversion by integration of the $^1$H NMR peaks of MMA and PMMA. The polymer was then isolated by precipitation into MeOH and recovered for GPC analysis (for Mn and PDI) using THF as the solvent. The results obtained are summarized in Table 2.

TABLE 2

| | Dark | | Irradiated | |
|---|---|---|---|---|
| Time, h | Conv., % | Mn (PDI) | Conv., % | Mn (PDI) |
| 0.33 | 9 | 2290 (1.26) | 10 | 2610 (1.32) |
| 0.67 | 11 | 2450 (1.30) | 18 | 3040 (1.51) |
| 1 | 14 | 2620 (1.34) | 26 | 3810 (1.50) |

TABLE 2-continued

| | Dark | | Irradiated | |
|---|---|---|---|---|
| Time, h | Conv., % | Mn (PDI) | Conv., % | Mn (PDI) |
| 1.5 | 47 | 2880 (1.38) | 32 | 4420 (1.53) |
| 2 | 18 | 3170 (1.40) | 37 | 5100 (1.51) |
| 2.5 | 22 | 3450 (1.44) | 44 | 5580 (1.53) |
| 3 | 28 | 3940 (1.41) | 51 | 6200 (1.49) |
| 4 | 35 | 4580 (1.42) | 62 | 8240 (1.31) |
| 6 | 39 | 4680 (1.44) | 80 | 10100 (1.26) |
| 8 | 40 | 4800 (1.43) | 88 | 11100 (1.23) |
| 24 | 41 | 4830 (1.42) | 100 | 12100 (1.22) |

What is claimed is:

1. A process for the polymerization of vinyl monomers by atom transfer radical polymerization using a first compound containing a transition metal and a second compound capable of radically transferring an atom or group to said first compound, wherein the improvement comprises, irradiating with visible light with an intensity of at least about 5 mW/cm$^2$ a liquid in which said polymerization is taking place.

2. A process for the polymerization of one or more vinyl monomers, comprising, contacting in a liquid medium a first compound containing a transition metal, a second compound capable of radically transferring an atom or group to said first compound, and one or more of said vinyl monomers to cause said polymerization, provided that while said polymerization is occurring said liquid medium is irradiated with visible light with an intensity of at least about 5 mW/cm$^2$.

3. The process as recited in claim 1 or 2 wherein said transition metal is in a lower valent state.

4. The process as recited in claim 1 or 2 wherein said vinyl monomers are an acrylic, styrenic, or a mixture of an acrylic and a styrenic.

5. The process as recited in claim 3 wherein said vinyl monomers are an acrylic, styrenic, or a mixture of an acrylic and a styrenic.

6. The process as recited in claim 5 wherein said compound containing a transition metal is a compound of Cu(I), Ru(I), Ni(II), Fe(II), Pd(II) or Rh(II).

7. The process as recited in claim 5 wherein said compound containing a transition metal is a compound of Cu(I).

8. The process as recited in claim 5 wherein said second compound is an arylsulfonyl halide or an organic halide.

9. The process as recited in claim 6 wherein said second compound is an arylsulfonyl halide or an organic halide.

10. The process as recited in claim 1 or 2 wherein said intensity is about 20 mW/cm$^2$ or more.

* * * * *